United States Patent
Lapidous et al.

(10) Patent No.: US 11,470,060 B2
(45) Date of Patent: Oct. 11, 2022

(54) PRIVATE EXCHANGE OF ENCRYPTED DATA OVER A COMPUTER NETWORK

(71) Applicant: Pango Inc., Redwood City, CA (US)

(72) Inventors: Eugene Lapidous, Saratoga, CA (US); Swair Mehta, Half Moon Bay, CA (US); Maxim Molchanov, Mountain View, CA (US); Eduardo Panisset, San Jose, CA (US)

(73) Assignee: Twingate, Inc., Redwood City, CA (US)

( * ) Notice: Subject to any disclaimer, the term of this patent is extended or adjusted under 35 U.S.C. 154(b) by 223 days.

(21) Appl. No.: 16/704,372

(22) Filed: Dec. 5, 2019

(65) Prior Publication Data
US 2020/0228504 A1    Jul. 16, 2020

Related U.S. Application Data

(60) Provisional application No. 62/790,878, filed on Jan. 10, 2019.

(51) Int. Cl.
*H04L 9/40* (2022.01)
*G06F 9/455* (2018.01)
*H04L 9/08* (2006.01)

(52) U.S. Cl.
CPC ...... *H04L 63/0442* (2013.01); *G06F 9/45558* (2013.01); *H04L 9/0869* (2013.01);
(Continued)

(58) Field of Classification Search
CPC . H04L 63/0442; H04L 9/0869; H04L 63/123; H04L 63/166; G06F 9/45558; G06F 2009/45587; G06F 2009/45595
See application file for complete search history.

(56) References Cited

U.S. PATENT DOCUMENTS 7,181,014 B1 * 2/2007 Srivastava ............ H04L 9/0833
                                                              713/168
8,051,287 B2    11/2011 Shetty
(Continued)

FOREIGN PATENT DOCUMENTS

JP       2012100206 A  *  5/2012
WO    WO-2009018512 A1 *  2/2009  ........... H04L 63/166

OTHER PUBLICATIONS

ECC Cipher Suites for TLS. Internet Engineering Task Force, May 2006, [retrieved on Aug. 28, 2021]. Retrieved from the Internet <URL: https://datatracker.ietf.org/doc/html/rfc4492>. p. 8, 21, 24. (Year: 2006).*

(Continued)

*Primary Examiner* — Carl G Colin
*Assistant Examiner* — Zhe Liu
(74) *Attorney, Agent, or Firm* — David R. Stevens; Stevens Law Group

(57) ABSTRACT

A handshake message includes a field containing random data that is filled with data used to derive keying material on the source and destination computers. The data may be elliptic curve data and may include a representation of the data used by the destination computer to verify that elliptic curve data is present. The data may additionally include data for deriving second keying material on a second destination computer that the first destination computer forwards to the second computer, receives a response, and returns data from the response as part of its own handshake message.

20 Claims, 10 Drawing Sheets

(52) U.S. Cl.
CPC .......... H04L 63/123 (2013.01); H04L 63/166 (2013.01); *G06F 2009/45587* (2013.01); *G06F 2009/45595* (2013.01)

(56) References Cited

U.S. PATENT DOCUMENTS

| | | | | |
|---|---|---|---|---|
| 8,542,825 | B2 * | 9/2013 | Whillock | H04L 63/0428 380/278 |
| 8,966,267 | B1 * | 2/2015 | Pahl | H04L 9/3268 713/171 |
| 9,531,691 | B2 * | 12/2016 | Gero | H04L 9/083 |
| 9,961,055 | B1 * | 5/2018 | Johansson | H04L 9/0827 |
| 2012/0250866 | A1 * | 10/2012 | Matsuo | H04L 63/061 380/279 |
| 2012/0284506 | A1 * | 11/2012 | Kravitz | G06Q 40/00 713/151 |
| 2014/0304498 | A1 * | 10/2014 | Gonuguntla | H04L 63/168 713/151 |
| 2016/0373414 | A1 * | 12/2016 | MacCarthaigh | H04L 63/0281 |
| 2018/0075262 | A1 | 3/2018 | Auh | |
| 2018/0248706 | A1 | 8/2018 | Wallrabenstein | |
| 2019/0268808 | A1 * | 8/2019 | Mathison | H04W 4/06 |
| 2019/0356694 | A1 * | 11/2019 | Wang | H04L 63/0281 |

OTHER PUBLICATIONS

TLS Session Resumption without Server-Side State. Internet Engineering Task Force, Jan. 2008, [retrieved on Aug. 28, 2021]. Retrieved from the Internet <URL: https://datatracker.ietf.org/doc/html/rfc5077>. p. 10-11. (Year: 2008).*

TLS Protocol Version 1.3. Internet Engineering Task Force, Aug. 2018, [retrieved on Aug. 30, 2021]. Retrieved from the Internet <URL: https://datatracker.ietf.org/doc/html/rfc8446>. p. 15-16, 48, 51, 92-93 and 142. (Year: 2018).*

TLS 1.3 and Q&A. The Cloudflare Blog, Sep. 23, 2016, [retrieved on Sep. 1, 2016]. Retrieved from the Internet <URL: https://blog.cloudflare.com/tls-1-3-overview-and-q-and-a/>. p. 8. (Year: 2016).*

TLS handshake. OS Dev.org [online], Oct. 13, 2016 [retrieved on Aug. 28, 2021]. Retrieved from the Internet <URL: https://web.archive.org/web/20161013094047/https://wiki.osdev.org/TLS_Handshake>. p. 5. (Year: 2016).*

Bernstein. "Curve25519: new Diffie-Hellman speed records." International Workshop on Public Key Cryptography. Apr. 2006. p. 207-228. (Year: 2006).*

Badra et al., Extending TLS to secure Multihost Application Exchanges. 2012 IEEE 23rd International Symposium on Personal, Indoor and Mobile Radio Communications—(PIMRC), Sep. 1, 2012. p. 2500-2505 (Year: 2012).*

* cited by examiner

PRIVATE EXCHANGE OF ENCRYPTED DATA OVER A COMPUTER NETWORK

This application claims the benefit of U.S. Provisional Application Ser. No. 62/790,878, filed Jan. 10, 2019, which is hereby incorporated herein by reference in their entirety for all purposes.

FIELD OF THE INVENTION

The present invention relates generally to systems and methods for performing encrypted communication.

BACKGROUND OF THE INVENTION

The increased number and importance of online services provided over computer networks has led to an increased amount and impact of threats to user privacy, security, and freedom of access. If an external observer can detect the intended destination of the user's content request, such as a domain name, this information can be used to deny access (for instance, to enforce censorship) or to decrease the access speed (for instance, to degrade the quality of competitive service). It may also affect user privacy and security, for instance by observing user access to sensitive sites— banking, medical, work-related, etc. If multiple content requests can be associated with the same user (for instance, by the source network address of the request), external observer can accumulate the history of user activities, further eroding user privacy and security.

To protect the user's online activities from external observation, the user's computer may encrypt its traffic and forward it through an intermediary server, such as a Virtual Private Network (VPN) or a proxy. In addition to hiding the traffic from the observers between the user's computer and the intermediary server, the user's source network address is replaced by the intermediary's address when the user's request is forwarded to its intended destination. This further improves the user's privacy by degrading the ability of content providers to associate the same user with multiple requests or to deduce the user's geographic location.

To be effective, the use of a VPN or a proxy should be protected from external detection: a censor may block detected VPN traffic; a communication provider may throttle it to degrade quality of competing services. To hide VPN or proxy traffic from observation, it is often masked as a regular exchange of encrypted content with content providers that use Transport Layer Security (TLS), for instance by supporting Hyper Text Transport Protocol Secure (HTTPS). To increase resistance of VPN or proxy traffic to adversarial attacks, it is recommended to use full TLS handshake with per-session public/private keys, such as Elliptic Curve Diffie-Hellman Ephemeral (ECDHE) key exchange.

It would be an advancement in the art to improve the use of a VPN masked as HTTPS traffic.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1A:
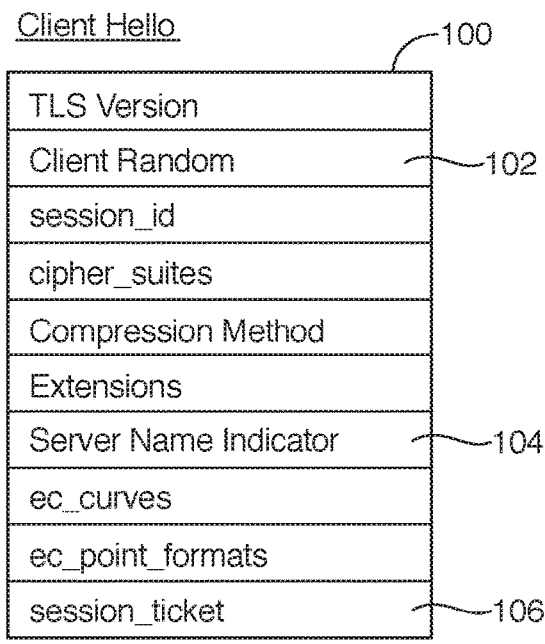
FIGS. 1A and 1B depict the relevant fields in the Client Hello and Server Hello messages exchanged during the Transport Level Security (TLS) handshake.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

In one aspect of the present invention, a method includes:
composing a first outgoing message in a first format, the first format being defined to contribute to derivation of a first keying material,
composing a second outgoing message in a second format, the second format being defined to contribute to derivation of a second keying material, wherein composing the second outgoing message includes embedding of at least part of the first outgoing message into the content of the second outgoing message while preserving the second format of the second outgoing message,
sending, by a first computer to a second computer over the computer network, the second outgoing message containing the at least the part of the first outgoing message,
receiving, by the first computer from the second computer over the computer network, at least one incoming message containing data in at least one third format, the at least one third format being defined to contribute to derivation of the first keying material,
deriving the first keying material while using the at least the part of the first outgoing message and the data in the at least one third format as two of a plurality of inputs, and then
sending, by the first computer to the second computer over the computer network, data encrypted using the first keying material.

In the context of the disclosed embodiments, the keying material may be data produced after the security handshake between the two computers and then used to derive one or more encryption keys used to exchange encrypted data and verify its integrity. For instance, in the case of Transport Layer Security (TLS) protocol handshake using Elliptic Curve Diffie-Hellman (ECDH) key exchange, keying material derived on the first computer may refer to the Master-Secret derived from the Client Random (from Client Hello), Server Random (from Server Hello), client private key (from Client Key Generation) and server public key (from Server Key Exchange). Keying material may be used to generate multiple key data, such as client MAC key, server MAC key, client write key, server write key, client write Initialization Vector (IV) and server write IV.

In some embodiments of this aspect, embedding the at least part of the first outgoing message into the content of the second outgoing message while preserving the second format comprises including at least part of the first message inside at least one data field of at least one message in the second format.

In some implementations, the second format is defined in accordance with Transport Level Security (TLS) protocol, while the second outgoing message is one from the group of Client Hello, Client Finished, Server Hello and Server Finished. In one instance, at least part of the first outgoing message is embedded into at least one field of the second outgoing message from the group of Client Random, Server Random, Session ID and Session Ticket.

In some embodiments, the first outgoing message includes a value derived from only one coordinate of an elliptic curve point, without including a value derived from another coordinate of the elliptic curve point.

In some implementations, the first keying material is derived only from the data in the first outgoing message and the data in at least one third format, while the size of the first outgoing message does not exceed 32 bytes.

In some embodiments, the second outgoing message comprises a session resumption message, and embedding the first outgoing message comprises including at least part of the first outgoing message instead of the session resumption data.

In one some implementations, the method further includes receiving at least one incoming message containing data in at least one fourth format, the fourth format being defined to contribute to derivation of the second keying material. In some embodiments, the data in the third and in the fourth formats may be received in the same incoming message.

In some implementations, the method further includes, after receiving the data in at least one fourth format:
 deriving the second keying material while using at least part of the first outgoing message and the data in at least one fourth format as two of a plurality of inputs, and then
 sending, by the first computer to the second computer over the computer network, data encrypted using the second keying material
 sending, by the first computer to the second computer over the computer network, data encrypted using the first keying material, wherein the data encrypted by the first keying material being forwarded by the second computer to the third computer, different from the second computer.

In one other aspect of the disclosed embodiments, a method includes:
 receiving, by a first computer from a second computer over the computer network, at least one incoming message containing a first data in a first format, the first format being defined to contribute to derivation of a first keying material, and a second data in a second format, the second format being defined to contribute to derivation of a second keying material, wherein the second data in the second format is included as a part of the first data in the first format,
 extracting at least part of the second data from the first data,
 deriving the second keying material while using at least part of the second data as one of the inputs,
 and then sending, by the first computer to the second computer over the computer network, the data encrypted using the second keying material.

In some embodiments of this aspect, the method further comprises:
 composing at least one outgoing message with a third data in a third format, the third format being defined to contribute to derivation of the second keying material,
 sending, by the first computer to the second computer over the computer network, the at least one outgoing message with the third data, and then
 receiving, by the first computer from the second computer, the data encrypted using the second keying material.

In some implementations, the first format is defined in accordance with TLS protocol, while the first incoming message is one from the group of Client Hello, Client Finished, Server Hello and Server Finished. In some instances, the first data is included as at least part of the field from the group of Client Random, Server Random, Session ID and Session Ticket.

In some embodiments of this aspect, each of the second data and the third data include values derived from only one coordinate of an elliptic curve point, without including a value derived from another coordinate of the elliptic curve point.

In some implementations, the second keying material is derived only from the second and the third data, while the size of both the second and the third data does not exceed 32 bytes.

In some embodiments of this aspect, the first data comprises a session resumption data, while at least part of the second data from the first data is extracted without using the first data for session resumption.

In some implementations, the first keying material is derived while using at least part of the first data as one of the inputs, and then both the data encrypted using the first keying material and the data encrypted using the second keying material are sent by the first computer to the second computer over the computer network.

In some embodiments, the second data is forwarded to the third computer over the computer network, and then the second keying material is derived on the third computer without deriving it on the second computer.

In some implementations, sending the data encrypted using the second keying material comprises: receiving, by the second computer, the data encrypted using the second keying material, from the third computer, and then forwarding the data encrypted using the second keying material to the first computer.

In another aspect of the disclosed embodiments, a method includes:
 receiving, by a first module of a first computer from a second module of a second computer over a computer network, at least one incoming message with a first data in a first format, the first format being defined to contribute to derivation of a first keying material, and with a second data in a second format, the second format being defined to specify at least one forwarding destination for at least some data received by the first module of the first computer from the second computer, wherein the second data in the second format is included as a part of the first data in the first format,
 extracting at least part of the second data from the first data,
 determining at least one forwarding destination from the extracted data, and then
 forwarding to a third module of a third computer, at least some data received from the second computer over the computer by network.

In some embodiments, at least some data from the first module to the third module is forwarded through a local connection between the first and the third modules, without sending the data to a public IP address. In some implementations, the first computer and the third computer reside on the same local network. In some instances, the first module and the third module reside in the different Virtual Machines (VMs) on the same local network. In other instances, the first module and the third module reside in different containers on the first computer, the first computer being the same as the third computer.

In some embodiments, at least some data forwarded from the first module to the third module is forwarded without forwarding the IP address of the second computer.

In some implementations, at least some data that is forwarded from the first module to the third module is forwarded without first being decrypted. In some instances, at least some forwarded data is decrypted by the third module, and then sent to one or more content servers over the computer network.

In some embodiments, the first module derives the first keying material and decrypts at least some data received from the second computer by using the first keying material, without sharing the first keying material with the third module.

In some embodiments of this aspect, the first format is defined in accordance with Transport Level Security (TLS) protocol, while the first incoming message is one from the group of Client Hello and Client Finished. In some instances, the second data is included as at least part of the field from the group of Client Random, Session ID and Session Ticket.

In some implementations, the second data comprises at least one from the group of an IP address, a domain name, an identifier of a Virtual Machine and an identifier of a container.

In some embodiments, the first data comprises a session resumption data, and at least part of the second data is extracted from the first data without using the first data for session resumption In yet another aspect of the present invention, a method includes:
  receiving first encrypted data by a first module of a first computer, the first data being forwarded to the first module after being received by a second module of a second computer from a third module of a third computer over the computer network, the first data being encrypted with the first key known to the first module but not to the second module,
  decrypting the first data by the first module, and then
  determining whether at least part of the decrypted first data is addressed to the second module, and, if so determined, sending second data derived from at least part of the first data to a fourth module without encrypting it with the first key, the fourth module being enabled to change a state of the second module.

In some embodiments, the first data is received by the first module over one or more first connections, while the second data is sent to the fourth module over one of the one or more first connections in reverse direction.

In some implementations, the second data includes a first message from the third computer to the second computer. In one instance, the first message is designed to cause the second computer to change the forwarding destination for at least some of a future data received from the third computer, so that at least some of the future data will be forwarded to a fifth module of a fifth computer, without being forwarded to the first module of the first computer.

In some implementations, where the at least some of the future data forwarded to the fifth module is encrypted with a second key, the first key being different from the second key, the first key being known to the first module but not to the second or the fifth module, the second key being known to the fifth module but not to the first or the second module.

In some instances, at least some data is forwarded to the fifth module without forwarding the IP address of the third computer to the fifth module.

In some implementations, the first message is designed to inform the second module whether to continue data exchange with the third computer. In some instances, the first message contains information about a payment received from the user of the third computer.

In some embodiments of this aspect, the second computer and at least one of the first computer and the fifth computer reside on the same local network. In some implementations, the second module and at least one of the first module and the fifth module reside in different Virtual Machines (VMs) on the same local network. In some other implementations, the second module and at least one of the first module and the fifth module reside in different containers on the second computer, the second computer being the same as at least one of the first computer and the fifth computer.

Figure 1B:
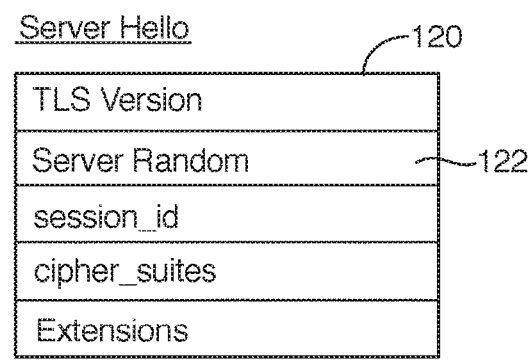

FIGS. 1A and 1B illustrate prior art example implementations of the Client Hello 100 and Server Hello 120 messages exchanged during the Transport Level Security (TLS) handshake according to TLS 1.2 protocol. When the full TLS handshake is performed, Client Hello 100 contains Client Random field 102 while Server Hello 120 contains Server Random field 122, each field including 32 bytes of the randomly generated data. Full TLS handshake often contains plaintext Server Name Indication (SNI) field 104, specifying the destination domain, making it easier for the censor to identify VPN or proxy server.

After the full TLS handshake is completed, client may resume a previous session by providing previously known session_ticket data 106. This decreases the number of round trips required to complete the TLS handshake and removes the need to provide SNI or other plaintext information. The security of the resumed session may be compromised if the keying material used to encrypt a previous session becomes exposed: session_ticket data exchange doesn't mandate unique keys per session (no perfect forward secrecy).

Figure 2:
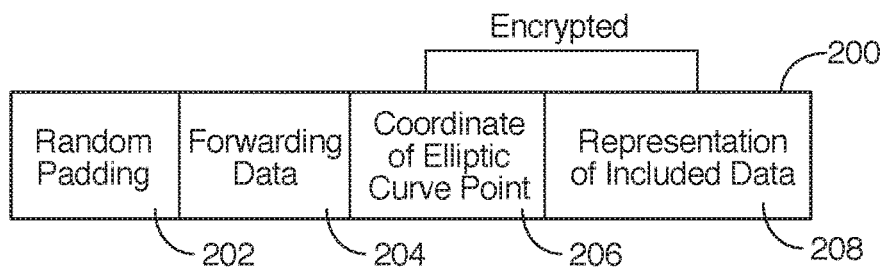
FIG. 2 depicts the data stored inside a field of the TLS handshake, according to an embodiment of the present invention.

FIG. 2 illustrates the data 200 that can be stored inside at least one field of the TLS handshake in some of the disclosed embodiments. In the described embodiment the data 200 contains at least one coordinate 206 of the elliptic curve point used to specify the public key of the ECDH exchange. ECDH public key is an elliptic curve point associated with a pair of (X,Y) coordinates. In the present embodiment, the client and destination server share the knowledge of the used elliptic curve, making it possible to calculate a shared key using only the X coordinate, decreasing the data size. Data 200 may also contain the representation 208 used to detect the presence and validate the integrity of the included data. In one instance, such representation is computed as a hash of the elliptic curve point data.

In the described embodiment, data 200 also contains the forwarding data 204, used to instruct a forwarding server to forward the elliptic curve data to the destination server, and random padding 202 to align with the corresponding field of the TLS handshake. In some implementations, the forwarding data is a network address of the destination server, such as an Internet Protocol (IP) address or a domain name that could be resolved to an IP address. In implementations, he forwarding data is an identifier of the destination server, such as an identifier of a Virtual Machine (VM) or a container. In some instances, the representation 208 is used by the destination server to validate both the elliptic curve coordinate 206 and the forwarding data 204, for example by being computed as a hash of both values.

Elliptic curve data 206 and its representation 208 may be encrypted with the public key of the destination server, hiding it from the forwarding server. Data 200 may be further encrypted with the public key of the forwarding server, to hide it from external observers.

In some embodiments, encryption of the elliptic curve data 206 may be used in conjunction with data transformation to make the data 206 seem random to external observers across multiple sessions.

In the described embodiment, forwarding data 204 is specified when data 200 is embedded into a message sent from the client, such as Client Hello; in other embodiments, data 200 may not contain the forwarding data 204 or representation 208, or may not have additional encryption for the elliptic curve data 206.

In some embodiments, the data 200 is embedded into the contents of the Client Random, Server Random or the session_ticket fields of the TLS handshake. In other embodiments, the data 200 can be embedded inside the other messages of the TLS handshake, such as Client Finished or Server Finished. To preserve format of the TLS handshake message, in some embodiments size of the data 200 is limited to 32 bytes.

Figure 3A:
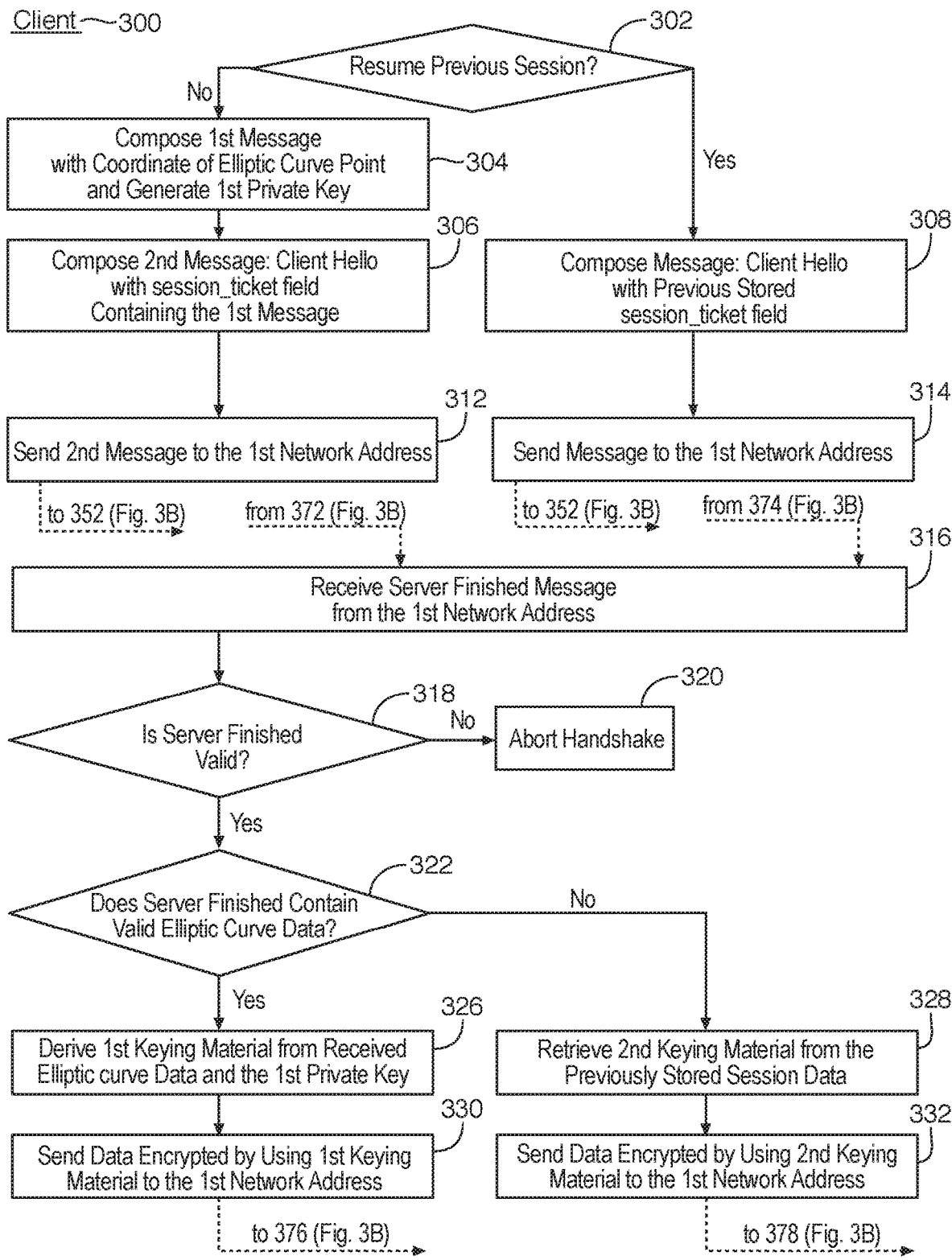
FIGS. 3A and 3B are process flow diagrams of a method for encrypting data exchange over a computer network, according to an embodiment of the present invention.
Figure 3B:
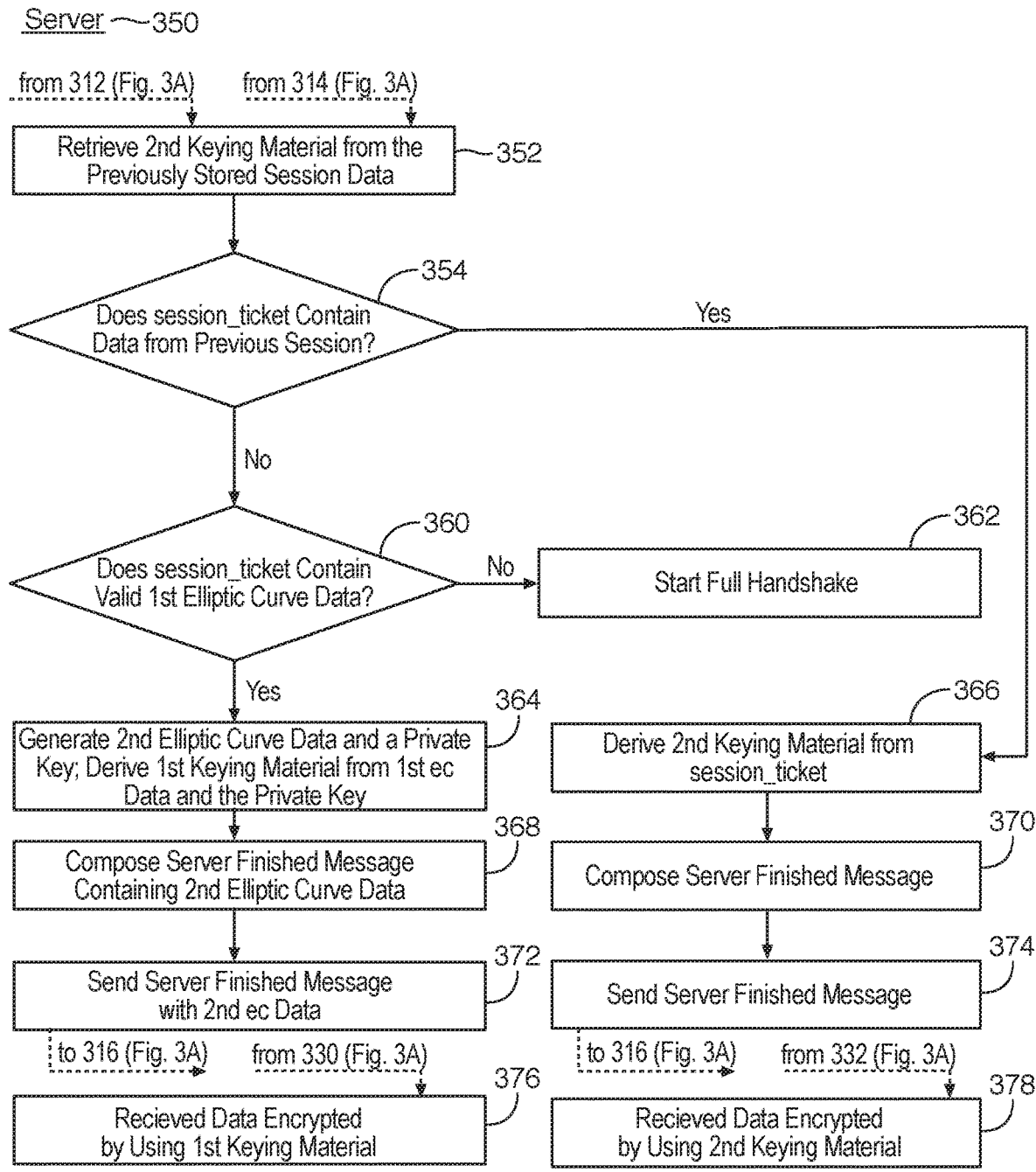

FIGS. 3A and 3B are the process flow diagrams of using TLS session resumption handshake to generate new keying material for encryption of the data exchange over a computer network.

Referring to FIG. 3A, the sequence of establishing new encrypted connection according to the present invention begins on the client computer 300, which evaluates 302 whether to resume the previous session. If the decision of step 302 is to start a new session with new encryption keys, client 300 generates 304 the data 200 including new coordinate 206 of an elliptic curve point, in order to provide the server with the client's public encryption key, and the client's private key corresponding to its public key.

The client then composes 306 the Client Hello message according to the TLS session resumption format, containing the session_ticket message.

Instead of providing a previously stored session_ticket data as the session_ticket message at step 306, the client, according to the present invention, embeds the data created at step 304 into the session_ticket field of the Client Hello message, and then sends 312 the session resumption message composed at step 306 (Client Hello message) to a first network address over the computer network, the first network address being associated with (e.g., acquired by) the server 350.

Alternatively, if decision 302 is to resume the previous session, the client composes 308 the Client Hello message with the previously stored session_ticket data in the session_ticket field, and then sends 314 the Client Hello message of step 308 to the first network address.

In some implementations, at least part of the session_ticket message is encrypted with a known public key of the server 350 to prevent its analysis by external observers.

Referring to FIG. 3B, the server 350 receives 352 the Client Hello message (whether from step 312 or step 314) and then evaluates 354 whether it contains valid data from the previous session. In one example, the server 350 makes this decision by decrypting the session_ticket message in the session ticket field with server's private key and then attempting to validate the session_ticket message against a Message Authentication Code (MAC) or a cryptographic hash in the session_ticket message. If the session_ticket doesn't contain previous session data (e.g., the MAC does not validate the session_ticket message), the server evaluates 360 whether the session_ticket field contains valid elliptic curve data. In some instances, the server 350 makes this decision by attempting to validate decrypted elliptic curve data against its representation, also included in the session_ticket message (see data 200 of FIG. 2). In this example, the MAC for the session_ticket message of a resumed session is computed differently than the representation 208 for the elliptic curve point data 206.

If elliptic curve data (hereinafter "first elliptic curve data") is validated at the step 360, the server 350 generates 364 second elliptic curve data in order to provide the client 300 with the server's public encryption key. The server's public key is then used by the client 300 together with the client's private key derived from the first elliptic curve (ec) data, in order to derive first keying material.

After step 364, the server composes 368 a Server Finished message that embeds the second ec data, and then sends 372 the Server Finished message from step 368 back to the client 300.

In some implementations, the Server Finished message composed by the server 250 contains both the second ec data and verification data for the second ec data. In some embodiments, the verification data included in the Server Finished message is derived from the hash of multiple messages exchanged during the TLS handshake, thereby validating the chain of handshake messages that include both the first and the second ec data.

In some instances, the Server Finished message also contains a representation of the second elliptic curve data used to detect its presence and validate its integrity.

If the first elliptic curve data is not recognized as valid at the step 360, the server 350 informs 362 the client 300 that it needs to start the full TLS handshake (at this point, the server has also verified 354 that session_ticket doesn't contain previous session data).

Alternatively, if the server 350 has decided 354 that the session_ticket contains valid data from the previous session, it derives 366 second keying material from the session_ticket accordingly to the prior art, composes 370 the Server Finished message and then sends it 374 back to the client 300 according to the conventional TLS handshake.

Referring to FIG. 3A, the client 300 receives 316 the Server Finished message, decrypts it and then evaluates 318 whether it verifies completion of the TLS handshake (e.g., by computing the hash of multiple messages exchanged during the TLS handshake and comparing it with one provided in the Server Finished message according to prior approaches for implementing the TLS handshake). It the TLS handshake isn't verified, client aborts it 320. If the Server Finished is validated at step 318, the client evaluates 322 whether it contains valid elliptic curve data; in one implementation it does it by using the representation of elliptic curve data provided in the same Server Finished message.

If elliptic curve data (i.e., the second ec data) is found valid, the client derives 326 first keying material from the second elliptic curve data and the client's private key, and then uses the first keying material to generate encryption keys, encrypts data (e.g., a content request) using the encryption keys and sends 330 the encrypted data to the server 350.

As described above, server-side processing of the Client Hello message includes decision 354 whether it contains data from the previous session. In some embodiments, client-side processing of the Server Finished message does not include the similar decision, because client already has access to the stored data from the previous session. If the valid Server Finished message does not contain the valid elliptic curve data at the step 322, the client 300 retrieves 328 stored second keying material from the previous session data, and then uses the previous session's keying material to generate the previous sessions keys (if not already generated) and uses the previous sessions keys to encrypt the data (e.g., the content request) and send 332 the encrypted data to the first network address associated with server 350.

Referring to FIG. 3B, the server 350 receives the data encrypted by using either the first (376) or the second (378) keying material and then decrypts it using the same keying material already known to the server 350 (the first keying material being derived from step 364, while the second keying material being derived from step 366).

As a result of the steps described in FIGS. 3A and 3B, the first keying material is generated during the TLS handshake that looks to an external observer like a standard session resumption exchange containing no plaintext data. However, the handshake modified accordingly to the present invention generates new encryption keys for the VPN or proxy session with the server 350 without relying on the previously stored data, thereby enabling perfect forward secrecy while taking the same time as the TLS 1.2 session resumption handshake: 1 round trip time (RTT). This enables the client 300 to securely and privately connect to any compatible VPN or proxy server 350 during 1 RTT, even if it's the first connection to that server.

Figure 4:
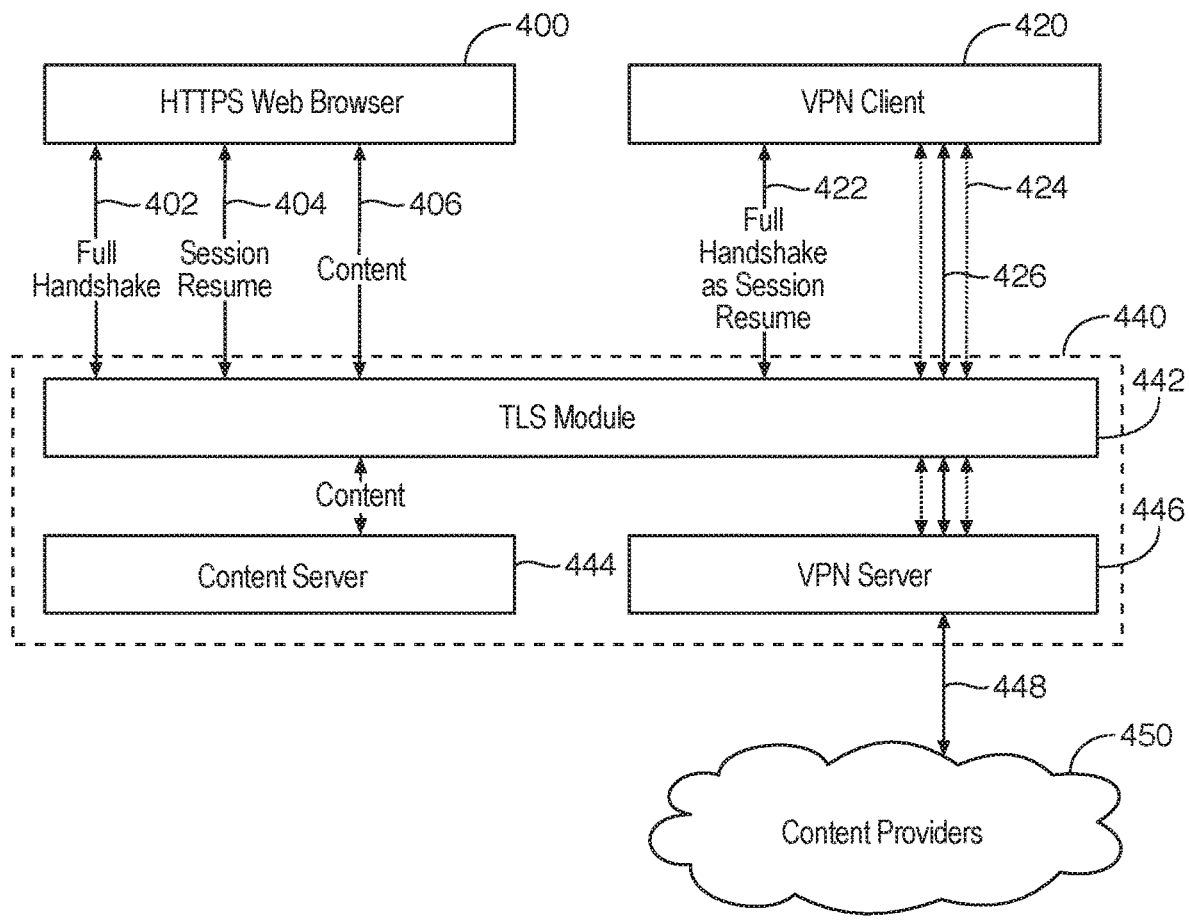
FIG. 4 is a schematic block diagram of a network environment for exchanging encrypted data over a computer network, according to an embodiment of the present invention.

FIG. 4 is a schematic block diagram of a network environment where the TLS session resumption handshake is used to resume a prior session with the content server or to establish a new session with a VPN server.

Referring to FIG. 4, Web Browser 440 is programmed to access HTTPS pages, for instance MICROSOFT EDGE browser developed by the MICROSOFT CORPORATION, and the VPN client 420 developed accordingly to the present invention are programmed to establish secure TLS connections and exchange encrypted data with the server 440.

The server 440 executes a TLS module 442 programmed to process the TLS session resumption handshake according to the embodiments disclosed herein, to decrypt the data received after the handshake and to forward the decrypted data either to the content server 444, or to the VPN server 446.

When a user of a VPN client 420 starts a VPN session, the VPN client 422 and TLS module 442 perform full ECDHE handshake masked as a session resumption request according to the embodiments disclosed herein. Keying material derived from this handshake is used to encrypt a TLS tunnel 424, encapsulating user's content request and response data 426.

In the described embodiment, TLS module 442 decrypts the tunnel packets and passes them to the VPN server 446, which removes the encapsulation and then exchanges content request and response data 448 with one or more content providers 450 over the computer network.

In order to prevent VPN sessions from detection, the same TLS module 442 may also support regular TLS connections, both with and without session resumption. For instance, a user of the HTTPS browser 400 may issue request for a content domain associated with an IP address of the server 440. To establish the connection, the browser 400 may either perform full TLS handshake 402, or the session resumption handshake 404. In the described embodiment, TLS module 442 is enabled to support handshakes 402, 404 and 442 and to distinguish between regular session resume 406 and the full handshake masked as session resume 422 according to the embodiments described herein. If a TLS connection has started with TLS handshake 402 or 404, TLS module passes the user data 406 received after completion of the handshake to the content server 444, instead of forwarding them to the VPN server 446.

As a result, external observer trying to check if the IP address associated with server 440 is used for the VPN services would see a server at this IP address responding to regular HTTPS requests as a content server, masking the use of the VPN service.

In some implementation, TLS module 442 stores a private TLS certificate for the domain associated with the content server 444 to support full handshake 402. In some instances, content server 444 resides on a different computer than the VPN server 446 with the TLS module 440 functioning as a proxy for the content exchange between the server hosting the TLS module 440 and the server hosting the content server 444.

Figure 5A:
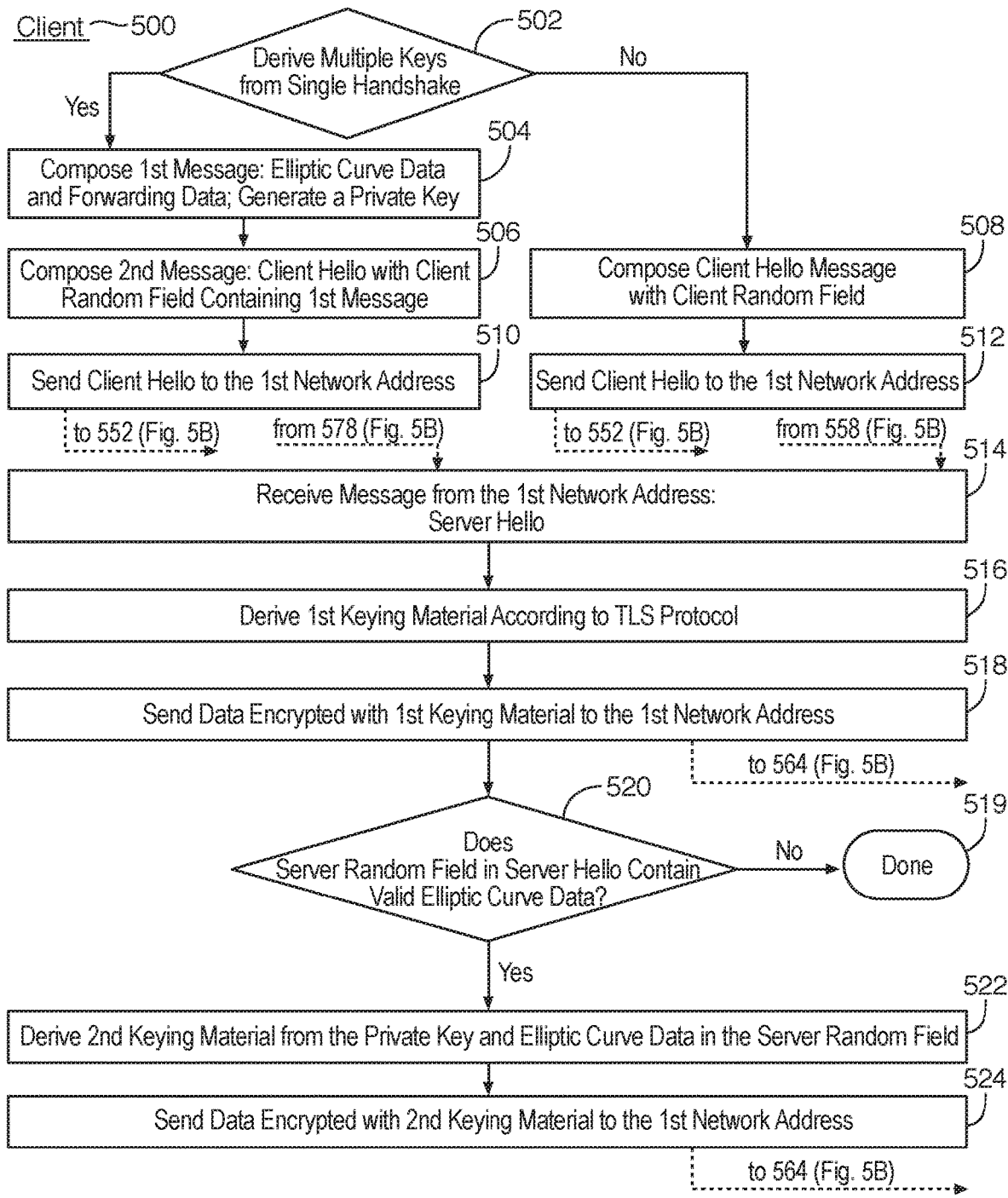
FIGS. 5A and 5B are process flow diagrams of a method for deriving multiple encryption keys from a data exchange over a computer network, according to an embodiment of the present invention.
Figure 5B:
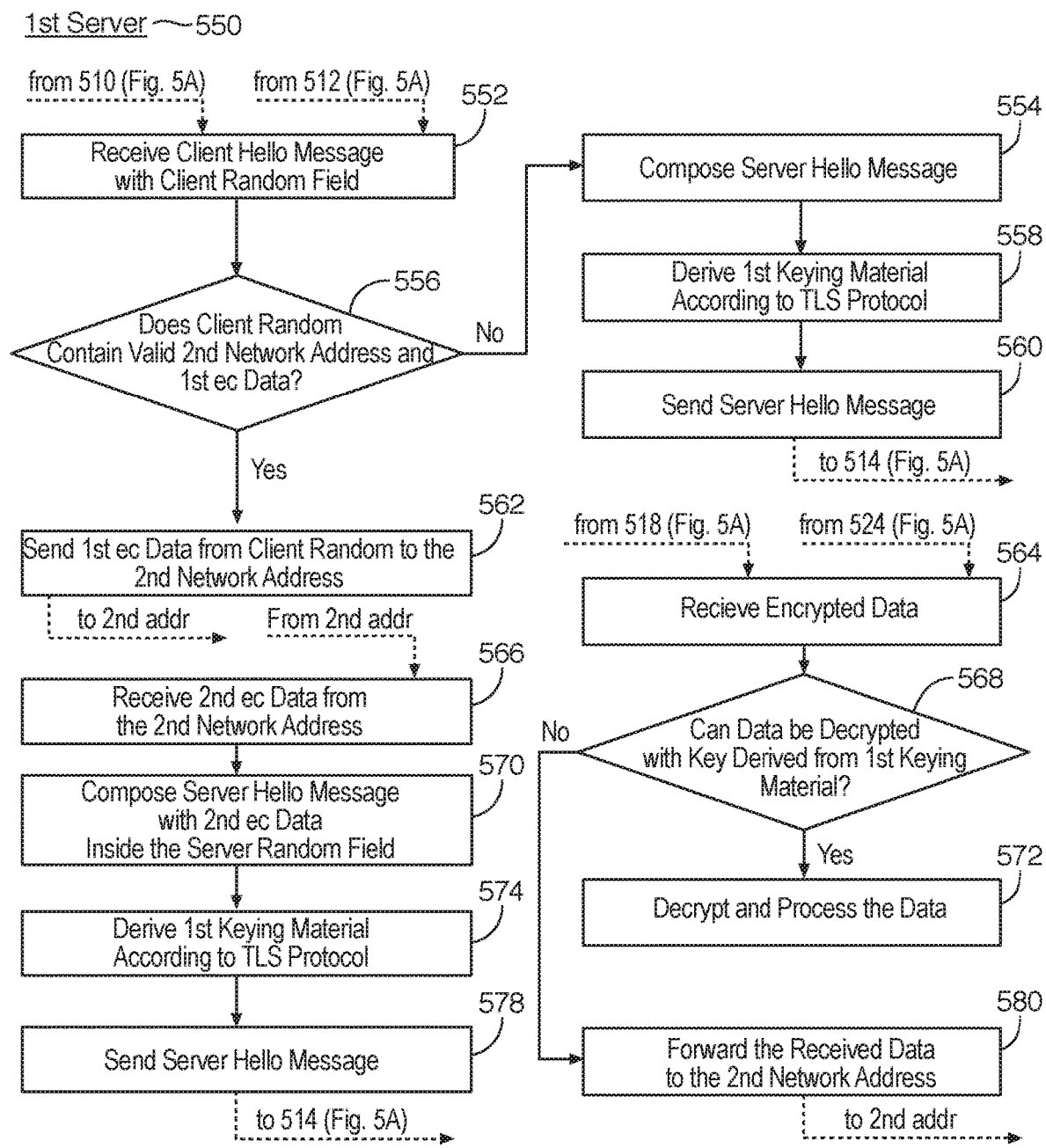

FIGS. 5A and 5B are the process flow diagrams of generating multiple keying materials during a single TLS handshake, and then using them to exchange encrypted data with different servers over a computer network, according to an embodiment of the present invention.

Referring to FIG. 5A, client 500 evaluates 502 whether to derive multiple keys from the single handshake while establishing a secure connection. In some embodiments, the decision 502 includes evaluation of the one or more client configuration parameters, available to the client before the start of the TLS handshake. For instance, the client 500 may need multiple keys to establish secure connections to different VPN servers accessible through a single IP address, as illustrated on FIG. 6.

In the described embodiment, if the outcome of the evaluation 502 is to obtain multiple keys during a single handshake, the client 500 obtains two keying materials: first keying material for secure connection to a first server at a first network address; second keying material for secure connection to a second server at a second network address.

To do that, client first composes 504 first message data including both elliptic curve data 206 defining the public key for ECDH exchange with the second server and the forwarding data 204, containing the second network address. In some implementations, the elliptic curve data 206, but not the forwarding data 204, is encrypted with the known public key of the second server. In some instances, the first message also contains a representation 208 of included data (204, 206) to detect its presence and validate its integrity. In one example, the first message, including the forwarding data, is encrypted with the known public key of the first server 550.

The client 500 then composes 506 the Client Hello message according to TLS protocol (for instance, TLS 1.3), while embedding data from the first message into the Client Random field of the Client Hello message instead of filling it completely with random data, and then sends 510 the Client Hello message to the first network address.

If the result of evaluation 502 is not to obtain multiple keys, the client 500 composes 508 a Client Hello message according to TLS protocol (for instance, TLS 1.3) and then sends 512 it to the first network address with Client Random field filled with random data.

Referring to FIG. 5B, the first server 550 at the first network address receives 552 the Client Hello message from the client 500 and then evaluates 556 whether it contains valid forwarding data and the first elliptic curve data—for instance, by using the representation 208 embedded into the Client Random field or the session_ticket field.

If the result of evaluation 556 is "Yes", the first server sends 562 the first elliptic curve data to the network address specified in the received forwarding data 204, in this instance the second network address associated with the second server. If first elliptic curve data is encrypted, the first server passes it to the second server without decryption.

In some embodiment, the second server decrypts the first elliptic curve data, generates its own private and public keys, uses its private key and the first elliptic curve data to derive the second key material, and then responds to the first server with the second elliptic curve data corresponding to the generated public key. In some implementations, the second server's response also includes a representation of the second elliptic curve data for validating the second elliptic curve data.

In some embodiments, the first server 500 waits to respond to the Client Hello message until it receives the response from the second network address, or until a predefined timeout period expires.

After receiving 566 the response from the second network address, the first server 550 composes 570 a Server Hello message with the received data from the response embedded into the Server Random field, derives 574 first keying material according to TLS protocol (for instance, according to TLS 1.3 which allows server to derive the keying material after receiving Client Hello with key share), and sends 578 the Server Hello message with the embedded data to the client 500. If the second elliptic curve data is encrypted, the first server 550 passes it to the client 500 without decryption.

If decision 556 is "No", the first server 550 composes 554 the Server Hello message and derives 558 the first keying material, both according to TLS protocol (for instance, TLS 1.3) and then sends the Server Hello message to the client 500.

Referring to FIG. 5A, the client receives 514 the Server Hello message and then derives 516 the first keying material according to the TLS protocol (for instance, TLS 1.3), which can then be used to send 518 data encrypted with the keys derived from the first keying material to the first network address.

The client also evaluates 520 whether the Server Random field of the Server Hello message contains valid elliptic curve data, for instance by detecting presence of the correct representation 208 of included data in the Server Random field.

If valid second elliptic curve data 206 is found, client derives 522 the second keying material from the previously generated private key and a public key derived from the second elliptic curve data, which can then be used to send 524 data encrypted with the keys derived from the second keying material to the first network address.

If valid second elliptic curve data is not found, client completes 519 the processing of the Server Hello message without deriving the second keying material.

Referring to FIG. 5B, after the TLS handshake is completed, the first server 550 at the first network address receives 560 the encrypted data and then evaluates 568 whether it can be decrypted with a key derived from the first keying material, known to the first server 550. If the result of evaluation 564 is "Yes", the first server 550 decrypts and processes the received data as requested by the client, for instance, removes the VPN tunnel encapsulation and then passes the payload packet to one or more content providers referenced in the received data. If first server 550 can't decrypt the received data (decision 568 is "No"), it forwards 580 it to the second network address for decryption with the keys derived from the second keying material, unknown to the first server 550.

In some implementations, the first server 550 stores the second network address after receiving the Client Hello message with the forwarding data, and then uses it to forward the data it can't decrypt. In other implementations, first server 550 may already know (e.g., store) the second network address before the Client Hello message is received—for instance, from the configuration parameter or from the prior history. In this case, the forwarding data 204 could be omitted from the TLS handshake performed according to the disclosed embodiments.

In other implementations, the first keying material is derived only after the completion of the TLS handshake: for instance, when using TLS 1.2, at least 2 RTTs are needed to derive the keying material during the full handshake, instead of 1 RTT for TLS 1.3.

In some implementations, the first ec data sent by the client may be included in a message other than the Client Hello message, for instance the Client Finished message according to the TLS protocol. In one instance, the 2nd ec data sent by the 2nd server may be included into the message other than Server Hello, for instance Server Finished.

As a result of the steps described in FIGS. 5A and 5B, at least two different keying materials can be generated during the single TLS handshake that looks to an external observer like a standard TLS handshake generating a single keying material. This hides the second keying material from the observer without increasing the time needed for the handshake (for instance, 1 RTT in case of TLS 1.3). The second keying material does not rely on the previously stored data, thereby enabling perfect forward secrecy. This allows the client 500 to securely and privately connect to any compatible VPN or proxy server by forwarding its traffic through the secure connection to another server.

Figure 6:
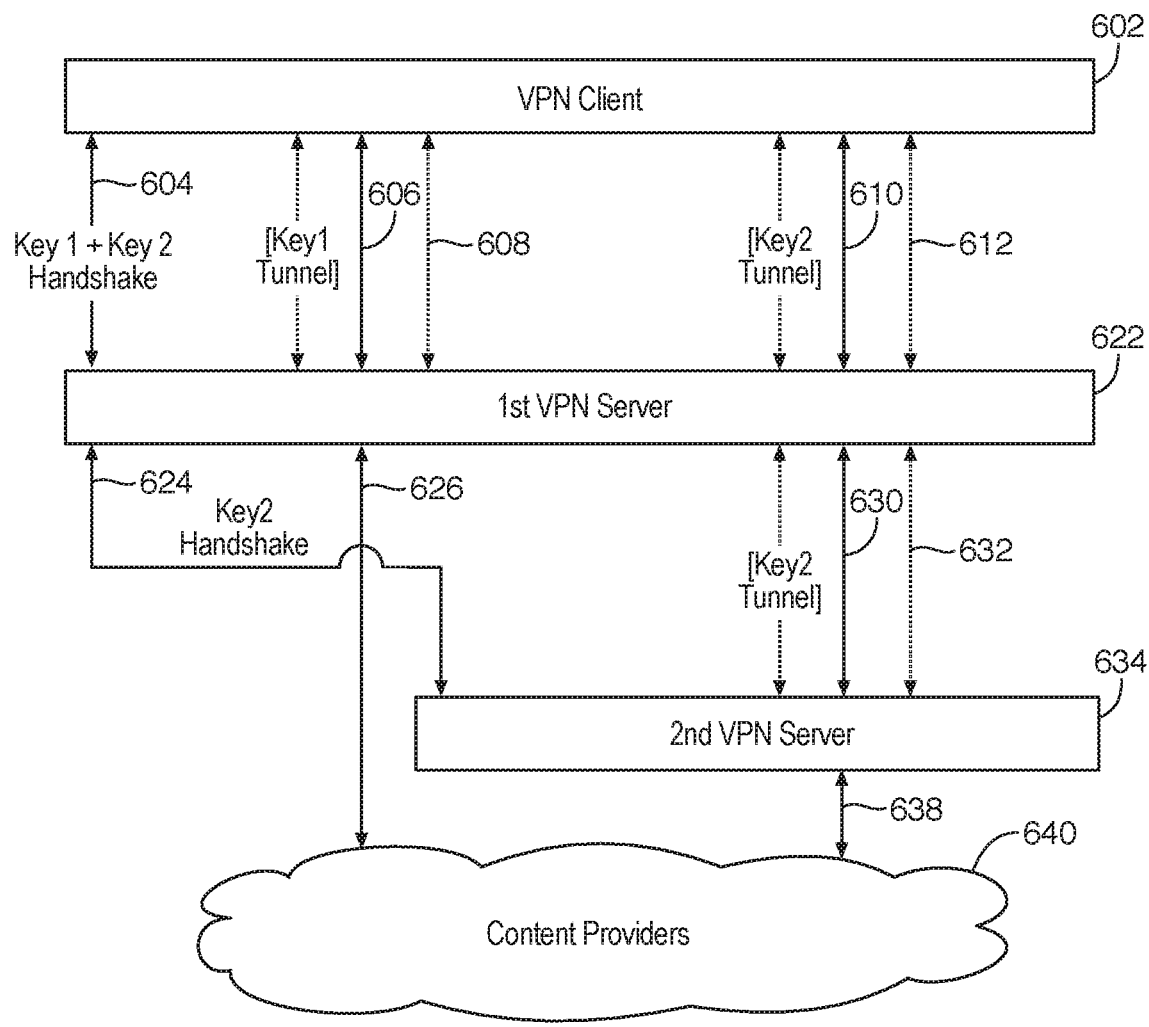
FIG. 6 is a schematic block diagram of a network environment for exchanging data encrypted with different encryption keys over a computer network, according to an embodiment of the present invention.

FIG. 6 is a schematic block diagram of a network environment for exchanging data encrypted with different encryption keys over a computer network.

Referring to FIG. 6, VPN client 602 initiates a security handshake 604 with the first VPN server 622 in order to obtain two different keying materials according to the present invention. As described in reference to FIGS. 5A and 5B, first server 622 forwards the data intended to derive the second keying material to the second VPN server 634, waits for its response and then returns it to the VPN client 602 as part of its own TLS handshake, enabling the client 602 to generate both the first and the second keying materials, the first keying material being shared only with the first server 622, while the second keying material is shared 624 only with the second server 634. At this point, the client 602 may establish the VPN tunnel with each of the first and the second server, either at the same time or at different times. Tunnel 608 that encrypts payload 606 with the key derived from the first keying material is decrypted by the first server 622, and then its payload 626 is passed to the content providers 640 over the computer network. Tunnel 612 encrypts payload 610 with the key derived from the second keying material. The first server 622 can't decrypt it and passes its packets to the second server 634, which extracts the payload 638 and then sends payload packets to the one or more content providers 640 referenced inside the tunnel 612.

In some implementations, the first server 622 does not share information about the source network address of the client 602 with the second server 634 while forwarding the tunnel packets 632 encapsulating the payload 630. In its turn, the second server 634 doesn't share information obtained from the payload 630 after the tunnel 632 is decrypted. In this way, the first server doesn't know the destinations and the content of client's traffic, while the second server doesn't know the client's network address, which preserves the client's privacy. The client's communication with the second server is hidden from an external observer, who only sees a connection to the first server; both connections are secure and use perfect forward secrecy.

The disclosed embodiments achieve privacy improvement without increasing the time to establish the connection (both keying materials are generated within the same handshake) or increasing the CPU load (payload is encrypted with only one key).

If the first and the second servers 622, 634 are located far from each other, it could create additional latency and packet losses. In this case, the client 602 may send less sensitive traffic through the first VPN server 622 that is allowed to know both the source address of the client and the destination of such traffic, while more sensitive traffic would be forwarded to the second VPN server 634.

In some implementations, the first and the second servers 622, 634 are deployed in the same local network, to avoid additional latency or packet losses. For instance, both servers could be deployed in the same co-location space rented from the same hosting provider. In one example, both servers are Virtual Machines (VMs) deployed on the same or different physical computers inside the same local network. In that example, forwarding data, if present, may contain a VM identifier identifying the second server 634, instead of the second network address of the second server 634. In another example, both servers 622, 634 could be deployed as containers, for instance as Docker containers developed by the Docker Inc., on the same physical computer. In this case the forwarding data, if present, may contain identifier of the container hosting the second server 634 instead of the second network address.

FIGS. 5A, 5B, and 6 describe an embodiment of the present invention where the two keying materials derived from the single handshake are used to securely communicate with two different servers, such as a proxy or VPN server, over the same IP address during the same secure connection.

In other embodiments, two keying materials derived from the single handshake could be used to exchange encrypted traffic with the same or different servers during different secure connections.

In some embodiments, the first keying material is used for the first secure connection after the full TLS 1.3 handshake that takes 1 RTT, while the 2nd keying material is used for the next secure connection, using 0-RTT session resumption protocol for an encryption key that was never used before.

In other embodiments, after two keying materials are derived from the same handshake, they are used to establish secure connections to two different servers located at different network addresses.

In still other embodiments, more than two keying materials are derived during the same handshake. In some instances, Client Random and Server Random fields of the TLS handshake carry a first set of elliptic curve point data used to derive first additional keying material, while Client Finished and Server Finished carry a second set of elliptic curve point data used to derive second additional keying material.

In still other embodiments, multiple keying materials derived from the same handshake could be used to encrypt the same data during the same connection, for instance, to increase resistance to decryption algorithms implemented on quantum computers.

In some embodiments, data embedded into the security handshake to derive additional keying material or to derive single keying material with perfect forward secrecy while masking such derivation as 1-RTT session resumption could be different from a single coordinate of the elliptic curve point. In one instance, such data could be derived from multiple coordinates of the elliptic curve points, or from another transformation of the elliptic curve data that could be used as a public key. In another instance, the data embedded according to the present invention could be used by different algorithms of key material derivation, such as lattice-based cryptography.

In one aspect of the disclosed embodiments, the data embedded into the security handshake is used for purposes other than generating additional keying material.

In some embodiments, at least one of the fields in at least one handshake message, for instance Client Random in Client Hello message, or Client Finished message, carries forwarding data such as network address of the destination server, such as an Internet Protocol (IP) address or a domain name that could be resolved to an IP address, without carrying the data used to generate additional keying material. In some instances of this embodiment, the client computer initiates the security handshake with a relay server over the computer network, while including forwarding data into the Client Random field of the Client Hello message. In some instances, the included forwarding data is encrypted with the public key of the relay server. After receiving the forwarding data, relay server forwards the handshake packets to the target server associated with forwarding data, such as a VPN or a proxy server. After that, the relay server continues to function as a forwarding proxy between the client computer and the target server.

In some implementations, the target server is a VPN server; the relay server does not share information about the source network address of the client with the VPN server while forwarding encrypted tunnel packets. The relay server doesn't know the destinations or content of the client's content requests, while VPN server doesn't know the client's source IP address. As a result, this implementation achieves privacy improvement without increasing the time to establish the connection (there is only one TLS handshake) or increasing the CPU load (payload is encrypted with only with one key).

In some implementations, the relay and the target servers are deployed in the same local network, to avoid additional latency or packet losses. For instance, both servers could be deployed in the same co-location space rented by the same hosting providers. In one example, both servers may be Virtual Machines (VMs) deployed on the same or different physical computers inside the same local network. In that example, forwarding data, if present, may contain VM identifier for the target servers, instead of the network address of the target servers. In another example, both relay and target servers could be deployed as containers, for instance as Docker containers developed by the Docker Inc., on the same physical computer. In this case the forwarding data, if present, may contain identifier of the container hosting the target server instead of the network address.

In some embodiments, the data embedded into the security handshake according to the present invention is used for purposes other than either generating an additional keying material or providing a forwarding data. In some instances, it includes authorization information, such as a user identifier, to control access to the destination server. In other instances, it includes user preferences, such as whether the content requests should be checked against the database of malicious sites. In still other instances, it includes user credit data, such as amount of bandwidth or connection time that could be provided to the user without additional payment. Multiple types of included data could be combined in the same handshake.

Another aspect of the disclosed embodiments enables the relay server to execute commands issued by the client computer without the need to decrypt or to analyze any packets of the security handshake or following data exchange.

Figure 7:
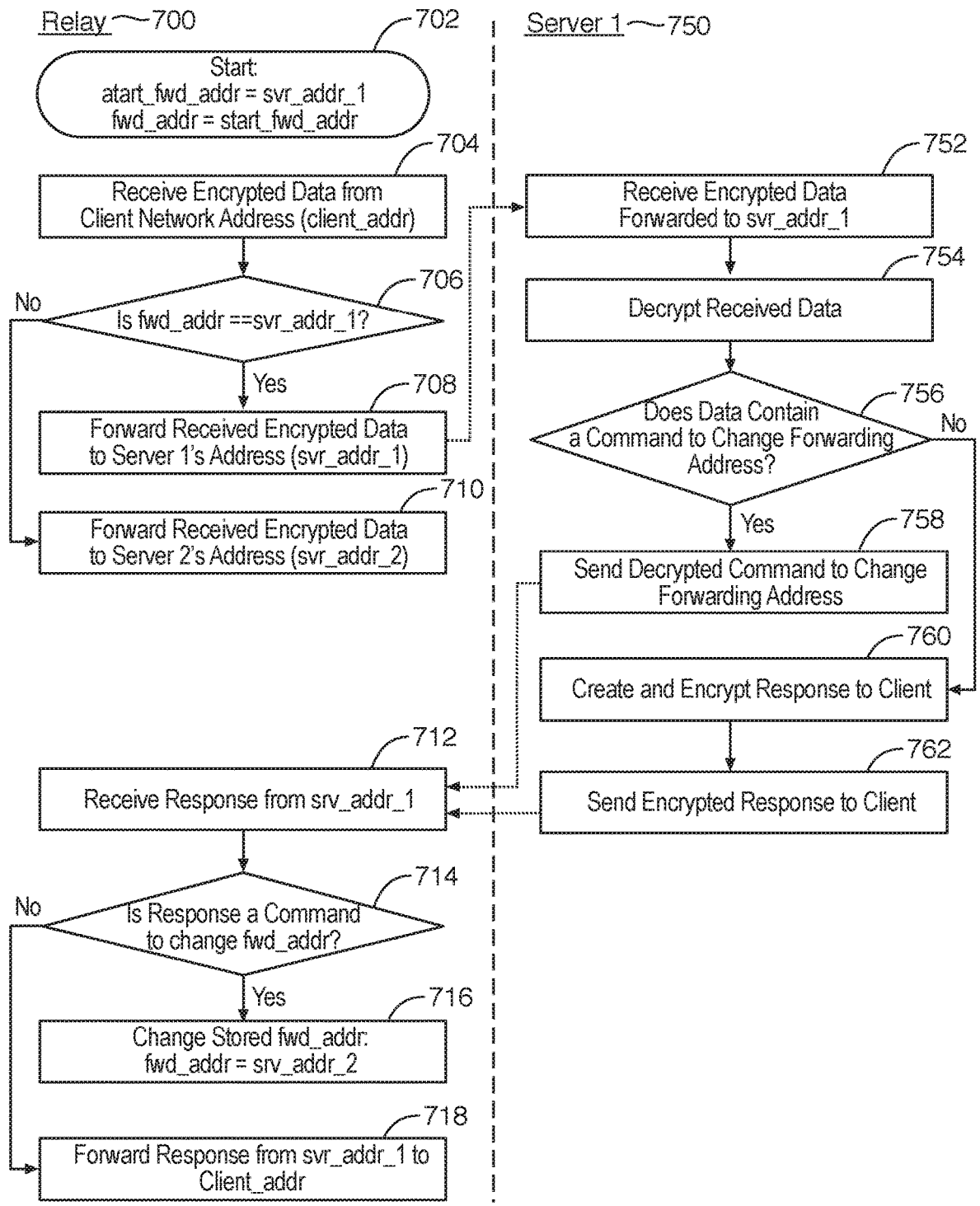
FIG. 7 is a process flow diagram of a method for forwarding the encrypted data over a computer network, according to an embodiment of the present invention.

FIG. 7 is a process flow diagram of a method for changing the forwarding address used by the forwarding relay.

Referring to FIG. 7, Relay computer 700 stores configuration parameter start_fwd_addr that specifies forwarding address for the data received at the start 702 of a connection with a client computer over a computer network. In the depicted case, Relay 700 starts the connection by setting current forwarding address fwd_addr to be equal to the start_fwd_addr, where start_fwd_addr is a network address svr_addr_1 of the Server 1 (750). In some instances, svr_addr_1 is an IP address or a domain name pointing to the Server 750.

The Relay computer 700 begins the secure connection with client computer by forwarding the security handshake from the client computer to the Server 750. At the completion of the security handshake, Server 750 obtains the keying material that allows to decrypt data from the client passing through the Relay computer 700.

The Relay computer 700 can't decrypt the data received from the client because it doesn't know the keying material derived from the security handshake; it can only forward it to the fwd_addr.

Upon receiving 704 the encrypted data from the client's network address (client_addr), the Relay evaluates 706 where to forward the received data. If fwd_address parameter is equal to svr_addr_1, it forwards 708 the encrypted data to the Server 750.

Upon receiving 752 the encrypted data, the Server 750 decrypts 754 it and then evaluates 756 whether the decrypted data contain a command to change forwarding address. In some instances, such an evaluation could be made by detecting that the client sent a content request with a reference to a script with a known name, such as relay_script.php, as described below. In another instance, the evaluation can be made by detecting an access to a specific port of the Server 750, or by detecting use of a custom protocol.

In the described embodiment, if such a command is detected, the Server 750 sends 758 it back to the Relay computer 700; this can be done over the same connection with the Relay computer 700 as was used to forward the encrypted data, or over an additional connection established between the Server 750 and the Relay computer 700.

If no such command is detected, the Server 750 continues normal processing: for instance, if the client has issued a content request, the Server 750 creates 760 an encrypted response with the requested content and then sends 762 it to the client.

The Relay computer receives 712 response data from the Server 750, it then evaluates 714 whether it's a command to change the forwarding address.

In some instances, the Relay computer includes a content server, referenced by the domain associated with the Relay computer; the content server detects a request issued by the Server 750 to this content server and extracts the command from parameters of the request. In other instances, the Relay computer 700 listens on a specific port, and detects a command sent by the Server 750 to that port. In still other instances, the Relay computer 700 watches for a data pattern corresponding to a custom protocol, while Server 750 uses that protocol to send the command.

In the illustrated embodiment, if the command is to change the forwarding address, the Relay computer 700 changes 716 the stored parameter fwd_addr to the address svr_addr_2 that points to a Server 2, different from Server 1 (750).

In some instances, after changing the forwarding address, the Relay computer 700 forwards the security handshake from the client computer to the Server 2, and then forwards the data encrypted with the key derived from this security handshake between the client and the Server 2.

If response data is not a command that could be understood by the relay computer 700, it forwards 718 the response to the client computer.

The described embodiment of FIG. 7 enables the Relay computer 700 to execute the client's commands such as changing the forwarding address, without being able to decrypt the client's data. This removes the need for the Relay computer 700 to terminate secure connections from the clients, protecting it from recognition by external observers, decreasing the potential security threats and simplifying the deployment.

After fwd_addr was changed to svr_addr_2, all subsequent data received 704 from the client are forwarded 710 to the Server 2's address in some embodiments.

In the instance where the command to change the forwarding address is included in the content request from the client to the Server 750, one implementation of such a request is as follows (for clarity, it is presented before URL encoding that would convert some symbols into the percent character "%" followed by two hexadecimal digits representing numeric value of replaced character):

https://server1_domain.com/
    relay_script.php?cmd=relay_domain.com/fwd.
    php?addr=192.168.1.27
    where:
server1_domain.com: sample domain referencing Server 1
relay_script.php: reference to a sample script in the content directory of Server 1
relay_domain.com: sample domain referencing Relay
fwd.php: sample script in the content directory of Relay
addr=192.168.1.27: example of the svr_addr_2
script relay_script.php on the Server 750 may be programmed to:
analyze whether query string (relay_domain.com/fwd.php?addr=192.168.1.27) is formatted as a URL. If not, tell the Server 1 that the data doesn't contain a command addressed to the relay
if query string is formatted as a URL, issue request to that URL: http://relay_domain.com/fwd.php?addr=192.168.1.27
script fwd.php on the Relay computer 700 may be programmed to:
parse the query string (addr=192.168.1.27)
if it contains recognizable command, execute the command (in this case, set fwd_addr=192.168.1.27).

In some instances, a content request from the client that contains a command to the Relay computer 700 also contains additional parameters to protect from replay attacks, such as a time stamp or a sequence number.

In some instances, a content request from the client that contains command to the Relay computer 700 also contains additional parameter to identify the client connection, such as a client ID or connection ID.

Figure 8:
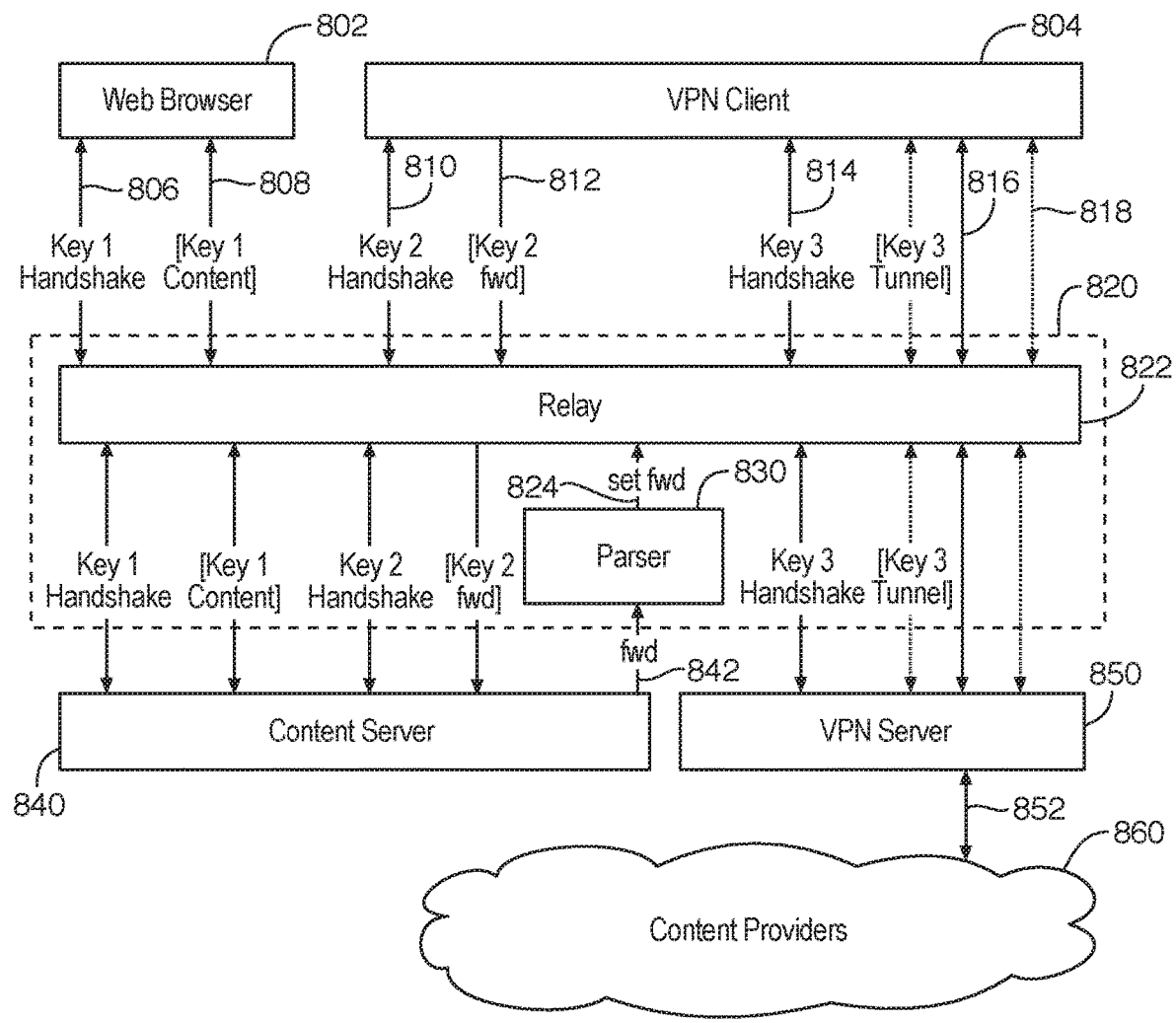
FIG. 8 is a schematic block diagram of a network environment for forwarding the encrypted data over a computer network, according to an embodiment of the present invention.

FIG. 8 is a schematic block diagram of a network environment for forwarding the encrypted data over a computer network.

Referring to FIG. 8, an HTTPS Web Browser 802 executes on a client, for instance MICROSOFT EDGE browser developed by the MICROSOFT CORPORATION, is programmed to establish secure TLS connections and exchange encrypted data with a content server 840, the exchanged data for each new connection being forwarded between the Web Browser 802 and the content server 840 by a Relay 822. In some instances, the Relay 822 functions as a proxy, set to forward data from each new connection to the Content server 840. To do that, it may open a new connection to the Content server 840 or use an already opened connection.

After the Web Browser 802 starts the connection with the Relay 822, it performs a security handshake 806 with the Content server 840, resulting in creating a shared encryption key 1, known to the Web Browser 802 and the Content server 840 but not to the Relay 822. After key 1 is established, it's used to exchange the encrypted content 808, for instance, to retrieve content of a web site stored on the server 840.

The VPN client 804 executing on the client and developed accordingly to the disclosed embodiments may be programmed to establish secure TLS connections and to exchange encrypted data with both the Content server 840 and a VPN server 850, the exchanged data for each new connection being forwarded between the VPN client 804 and the Content server 840 by the Relay 822. To establish a TLS connection with the Content server 840, the VPN client 804 performs a security handshake 810, like the handshake 806 performed by the Web Browser 802, resulting in deriving a shared encryption key 2, known to the VPN client 804 and the VPN server 850 but not to the Relay 820.

According to the disclosed embodiments, the format of the handshake 810 is set to be identical or similar to the format of the handshake 806, preventing external observers from distinguishing the security handshake to the Content server 840 initiated the Web Browser 802 from the one initiated by the VPN server 804. To further obfuscate use of the VPN server 850, the VPN client 804 may download at least part of the content stored on the server 840 after the security handshake 810 is completed.

In some embodiments, the VPN client 804 then sends the command 812 through the already established secure connection with the Content server 840. In some instances, this command is formatted as an HTTPS request to a script stored on the Content server 840.

In some instances, similar to those described above with respect to FIGS. 6 and 7, this request carries a command for the Relay 822 to change the forwarding address for the same connection; the Content server 840 decrypts the request and issues its own request 842 to the Relay 822, containing the information about the new forwarding address.

In the described embodiment, request 842 is formatted as an HTTP or HTTPS request to a Parser 830 executing on the server 820, which terminates the request and informs 824 the Relay 822 that it should change the forwarding address. In some implementations, Parser 830 and Relay 822 are located on the same physical server 820 and have shared access to the same memory space, while the request 842 is sent over the computer network between different servers. In some instances, the Parser 830 changes the value of the forwarding address stored in the shared memory, while the Relay 822 uses this value to forward the next packet arriving from the VPN client 804. In some instances, the stored value of the forwarding address is associated with a connection ID or user ID.

In other embodiments, the decrypted command from the Content server 840 to the Relay 822 could be sent without going through the Parser 830. In some instances of such embodiments, the Relay 822 inspects data arriving from the Content server 840; the Content server 840 sends data containing a pre-defined header and the command to the Relay 822. If the Relay 822 recognizes the header, it executes the command without passing the data to the VPM client 804.

In the described embodiment, VPN client 804 starts another security handshake 814 after sending the command 812 to change forwarding address. In some instances, this handshake is implemented without sending any of its data in plaintext form, for instance, by encoding Client Hello with known public certificate of the VPN server 850 and using random padding to obfuscate the exchange.

As a result, an external observer can't notice when the encrypted data exchange between the VPN client 804 and the Relay 820 changes from using the encryption key 2 to establishing and then using a different encryption key 3.

The Relay 822 forwards the handshake data between the VPN client 804 and VPN server 850 but can't decrypt its data or derive the key 3.

After the new encryption key is established, the VPN client 804 uses it to encrypt a tunnel 818 with payload 816, such as the content request; the Relay 822 forwards the tunnel's packets between the VPN client 804 and the VPN server 850 without decrypting them. The VPN server 850 extracts the payloads and exchanges the data 852 with one or more content providers 860 and then forwards the responses from the one or more content providers 860 inside the tunnel encrypted with key 3 to the VPN client 804.

The described embodiment enables data exchange between the VPN client and the VPN server that is difficult to distinguish from the exchange between the regular Web Browser 802 and the content server 840. External attempts to analyze the first handshake would indicate that it's valid and the computer at the destination network address should be in possession of the private key corresponding to the registered domain. However, the described embodiment makes it unnecessary for the Relay 822 to know (e.g., previously store) this key: it just forwards the initial data to the content server 840, which stores the private key, and then changes the forwarding destination after the first handshake is completed, while continuing to accept encrypted packets. In the described embodiment, this is accomplished by sending the command from the VPN client 804 to the Relay 822 by first using the Relay 822 to forward the command to another destination, and then sending the decrypted command back to the same Relay 822 that forwarded the command.

In some embodiments, the Relay 822 forwards the data to the VPN server 850 without providing information about a source network address of the VPN client 804, thereby preserving the user's privacy. In some implementations, the Relay 822 and VPN server 850 are deployed on the same local network, to minimize the latency and packet losses. In some instances, the Relay 822 and the VPN server 850 are deployed on different Virtual Machines (VMs) within the same local network. In another implementation, the Relay 822 and the VPN server 850 are deployed in different containers on the same physical computer.

In some embodiments, the VPN client 804 is programmed to send the information to the Relay other than one related to the change of the forwarding address. In one instance, the VPN client provides the Relay with information needed to authorize the client, such as user or device ID at the beginning of VPN session.

In some instances, the VPN client 804 periodically changes the forwarding address back to the Content server 840, and then sends the information needed to authorize use of additional resources. In some implementations, the VPN client 804 periodically sends payment information, such as a payment token, to request use of additional bandwidth or additional time during the same VPN session. After the payment is validated, the VPN client 804 sends the command to switch the forwarding address again and continues the session.

In other implementations, the command sent to the Relay 822 contains multiple instructions: for instance, process payment information and, if additional use of the resource is authorized, change the forwarding address.

In some instances, the VPN client 804 may send multiple commands to change forwarding addresses to different VPN servers, thereby enabling multiple VPN sessions forwarded over the same connection between the VPN client 804 and the Relay 722.

In the described embodiments, the VPN client 804 establishes a secure VPN tunnel with the VPN server 850 over the computer network. In other embodiments, the VPN client 804 establishes secure proxy connection with a proxy server over the computer network. In still other embodiments, the VPN client 804 establishes one or more secure connections with one or more content servers 860 over the computer network.

Figure 9:
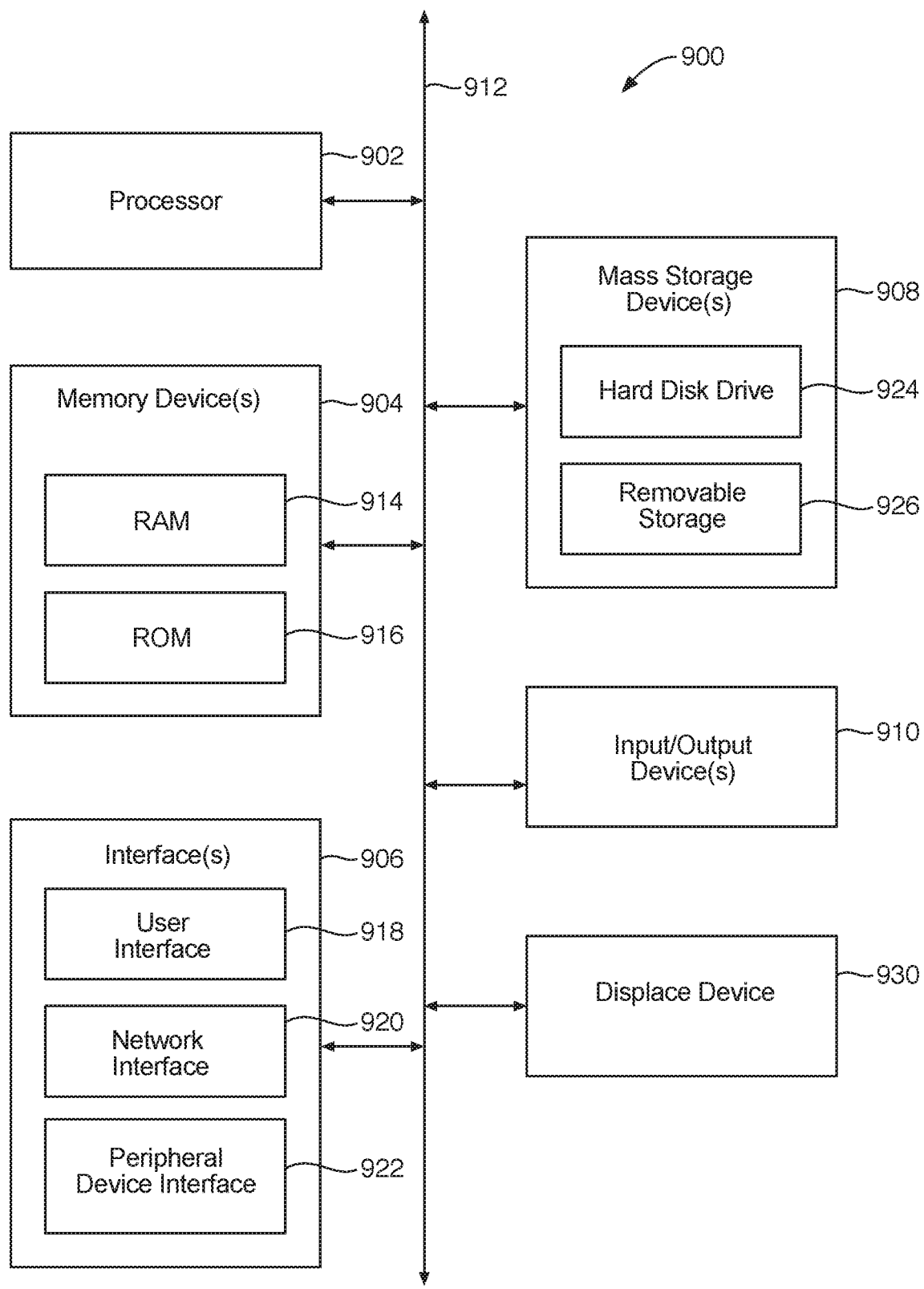
FIG. 9 is a schematic block diagram of a computing device that may be used to implement the systems and methods described herein.

Computing devices (client, server, proxy server, VPN server, content server, etc.), networking components, and modules described herein may have some or all of the attributes of the computing device 900 of FIG. 9. In particular, components described above as being a computer or a computing device may have some or all of the attributes of the computing device 900 of FIG. 9. FIG. 9 is a block diagram illustrating an example computing device 900 which can be used to implement the systems and methods disclosed herein Computing device 900 includes one or more processor(s) 902, one or more memory device(s) 904, one or more interface(s) 906, one or more mass storage device(s) 908, one or more Input/Output (I/O) device(s) 910, and a display device 930 all of which are coupled to a bus 912. Processor(s) 902 include one or more processors or controllers that execute instructions stored in memory device(s) 904 and/or mass storage device(s) 908. Processor(s) 902 may also include various types of computer-readable media, such as cache memory.

Memory device(s) 904 include various computer-readable media, such as volatile memory (e.g., random access memory (RAM) 914) and/or nonvolatile memory (e.g., read-only memory (ROM) 916). Memory device(s) 904 may also include rewritable ROM, such as Flash memory.

Mass storage device(s) 908 include various computer readable media, such as magnetic tapes, magnetic disks, optical disks, solid-state memory (e.g., Flash memory), and so forth. As shown in FIG. 9, a particular mass storage device is a hard disk drive 924. Various drives may also be included in mass storage device(s) 908 to enable reading from and/or writing to the various computer readable media. Mass storage device(s) 908 include removable media 926 and/or non-removable media.

I/O device(s) 910 include various devices that allow data and/or other information to be input to or retrieved from computing device 900. Example I/O device(s) 910 include cursor control devices, keyboards, keypads, microphones, monitors or other display devices, speakers, printers, network interface cards, modems, lenses, CCDs or other image capture devices, and the like.

Display device 930 includes any type of device capable of displaying information to one or more users of computing device 900. Examples of display device 930 include a monitor, display terminal, video projection device, and the like.

Interface(s) 906 include various interfaces that allow computing device 900 to interact with other systems, devices, or computing environments. Example interface(s) 906 include any number of different network interfaces 920, such as interfaces to local area networks (LANs), wide area networks (WANs), wireless networks, and the Internet. Other interface(s) include user interface 918 and peripheral device interface 922. The interface(s) 906 may also include one or more user interface elements 918. The interface(s) 906 may also include one or more peripheral interfaces such as interfaces for printers, pointing devices (mice, track pad, etc.), keyboards, and the like.

Bus 912 allows processor(s) 902, memory device(s) 904, interface(s) 906, mass storage device(s) 908, and I/O device(s) 910 to communicate with one another, as well as other devices or components coupled to bus 912. Bus 912 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 900, and are executed by processor(s) 902. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method of encrypting data exchange over a computer network, the method comprising:
   composing, by a first computer, a first outgoing message in a first format, the first format including, a first portion defined to contribute to derivation of a first keying material, a second portion enabling detection and validation of the first portion, and a forwarding address;
   composing, by the first computer, a second outgoing message in a second format, the second format being defined to contribute to derivation of a second keying material, wherein composing the second outgoing message includes embedding the first portion and the second portion into content of the second outgoing message while preserving the second format of the second outgoing message;
   sending, by the first computer to a second computer over the computer network at a first address different from the forwarding address, the second outgoing message containing the first portion and the second portion of the first outgoing message;
   receiving, by the first computer from the second computer over the computer network, at least one incoming message containing data in at least one third format, the at least one third format being defined to contribute to derivation of the first keying material and being received by the second computer from the forwarding address;

deriving the first keying material while using the first portion of the first outgoing message and the data in the at least one third format as two of a plurality of first inputs; and sending, by the first computer to the second computer over the computer network, data encrypted using the first keying material.

2. The method of claim 1, wherein embedding the first portion and the second portion of the first outgoing message into the content of the second outgoing message while preserving the second format comprises including the first portion and the second portion of the first outgoing message inside at least one data field of the second outgoing message.

3. The method of claim 1, where the second format is defined in accordance with Transport Level Security (TLS) protocol, while the second outgoing message is a message according to TLS protocol selected from a group consisting of Client Hello, Client Finished, Server Hello and Server Finished.

4. The method of claim 3, wherein the first portion and the second portion of the first outgoing message is embedded into at least one field of the second outgoing message selected from a group consisting of Client Random, Server Random, Session ID and Session Ticket.

5. The method of claim 1, wherein the first portion includes a value derived from only one coordinate of an elliptic curve point, without including a value derived from another coordinate of the elliptic curve point.

6. The method of claim 1, wherein the first keying material is derived only from the first portion in the first outgoing message and the data in the at least one third format, while a size of the first outgoing message does not exceed 32 bytes.

7. The method of claim 1, wherein the second outgoing message comprises a session resumption message and embedding the first portion and the second portion of the first outgoing message comprises including the first portion and the second portion of the first outgoing message in place of the session resumption message.

8. The method of claim 1, further comprising:
receiving, by the first computer, an incoming message containing data in at least one fourth format, the at least one fourth format being defined to contribute to derivation of the second keying material.

9. The method of claim 8, where the data in the at least one third format and the data in the at least one fourth format are both received in the incoming message.

10. The method of claim 8, further comprising, after receiving the data in the at least one fourth format:
deriving, by the first computer, the second keying material while using the first portion of the first outgoing message and the data in the at least one fourth format as two of a plurality of second inputs;
sending, by the first computer to the second computer over the computer network, data encrypted using the second keying material;
sending, by the first computer to the second computer over the computer network, the data encrypted using the first keying material, wherein the data encrypted using the first keying material is forwarded by the second computer to a third computer, different from the second computer.

11. A method of encrypting data exchange over a computer network, the method comprising:
receiving, by a first computer from a second computer over the computer network, at least one incoming message containing a first data in a first format, the first format being defined to contribute to derivation of a first keying material, and a second data in a second format, the second format including a first portion defined to contribute to derivation of a second keying material, a second portion enabling detection and validation of the first portion, and a forwarding address, wherein the second data in the second format is included as a part of the first data in the first format;
extracting, by the first computer, at least part of the second data from the first data;
transmitting, by the first computer, the at least the part of the second data to the forwarding address;
receiving, by the first computer from the forwarding address, the second keying material;
transmitting, by the first computer, the second keying material to the second computer over the computer network;
receiving, by the first computer, packets encrypted using the second keying material; and
passing, by the first computer, the packets encrypted using the second keying material to the forwarding address without decrypting the packets.

12. The method of claim 11, further comprising:
composing, by the first computer, at least one outgoing message with a third data in a third format, the third format being defined to contribute to derivation of the second keying material;
sending, by the first computer to the second computer over the computer network, the at least one outgoing message with the third data; and
receiving, by the first computer from the second computer, fourth data encrypted using the second keying material.

13. The method of claim 11, where the first format is defined in accordance with Transport Level Security (TLS) protocol, while the at least one incoming message is selected from a group consisting of messages according to the TLS protocol including Client Hello, Client Finished, Server Hello and Server Finished.

14. The method of claim 13, wherein the first data is included as at least part of a field selected from a group consisting of Client Random, Server Random, Session ID and Session Ticket.

15. The method of claim 12, wherein each of the first portion and the third data include values derived from only one coordinate of an elliptic curve point, without including a value derived from another coordinate of the elliptic curve point.

16. The method of claim 12, wherein the second keying material is derived only from the second and the third data, while the size of both the second and the third data does not exceed 32 bytes.

17. The method of claim 11, wherein the first data comprises a session resumption data, further comprising:
extracting, by the first computer, at least part of the second data from the first data without using the first data for session resumption.

18. The method of claim 11, further comprising:
deriving, by the first computer, the first keying material while using at least part of the first data as one of inputs used to derive the first keying material; and sending, by the first computer to the second computer over the computer network, data encrypted using the first keying material in addition to the first data encrypted using the second keying material.

19. The method of claim 11, further comprising:
deriving the second keying material on a third computer at the forwarding address without deriving the second keying material on the second computer.

20. The method of claim 19, wherein transmitting, by the first computer, the at least the part of the second data to the forwarding address comprises:
sending the at least the part of the second data to the third computer without providing an address of the second computer to the third computer such that privacy of the second computer is preserved.

* * * * *